US00RE47776E

(19) United States
(12) Reissued Patent
Aliakseyeu et al.

(10) Patent Number: US RE47,776 E
(45) Date of Reissued Patent: Dec. 17, 2019

(54) METHODS AND APPARATUS FOR COMPENSATING A REMOVAL OF LEDS FROM AN LED ARRAY

(71) Applicant: SIGNIFY HOLDING B.V., Eindhoven (NL)

(72) Inventors: Dzmitry Viktorovich Aliakseyeu, Eindhoven (NL); Philip Steven Newton, Waalre (NL); Dirk Valentinus Rene Engelen, Heusden-Zolder (NL); Tim Dekker, Eindhoven (NL)

(73) Assignee: SIGNIFY HOLDING B.V., Eindhoven (NL)

(21) Appl. No.: 15/787,929

(22) Filed: Oct. 19, 2017

Related U.S. Patent Documents

Reissue of:
(64) Patent No.: 9,220,148
Issued: Dec. 22, 2015
Appl. No.: 14/434,145
PCT Filed: Sep. 13, 2013
PCT No.: PCT/IB2013/058515
§ 371 (c)(1),
(2) Date: Apr. 8, 2015
PCT Pub. No.: WO2014/057373
PCT Pub. Date: Apr. 17, 2014

U.S. Applications:
(60) Provisional application No. 61/710,894, filed on Oct. 8, 2012.

(51) Int. Cl.
*H05B 37/02* (2006.01)
*H05B 33/10* (2006.01)
*H05B 33/08* (2006.01)

(52) U.S. Cl.
CPC ..... *H05B 33/089* (2013.01); *H05B 33/0821* (2013.01); *H05B 33/0824* (2013.01); *H05B 33/10* (2013.01)

(58) Field of Classification Search
CPC ..... H05B 33/089; H05B 33/0821
See application file for complete search history.

(56) References Cited

U.S. PATENT DOCUMENTS 7,535,180 B2 * 5/2009 Negley ..... H05B 33/0803 315/185 S
7,791,584 B2 * 9/2010 Korcharz ..... H05B 33/0893 327/175
8,272,757 B1 * 9/2012 Fan ..... H01L 25/0753 257/778

(Continued)

FOREIGN PATENT DOCUMENTS

WO 2011028335 A1 3/2011

*Primary Examiner* — Angela M Lie
(74) *Attorney, Agent, or Firm* — Meenakshy Chakravorty

(57) ABSTRACT

Methods and apparatus related to compensating for electrical changes resulting from cut-out of a portion of a grid of a plurality of LEDs (20A-T; 120; 220; 320). A compensating unit (40; 140; 240; 340) may be coupled to free wire segments of the grid that are created by the cut-out and the compensating unit (40; 140; 240; 340) may be configured to alter current supplied to remaining LEDs of the grid of LEDs. The compensating unit is configured to and/or may be configured to lessen current supplied to one or more LEDs of an LED-based lighting unit.

18 Claims, 8 Drawing Sheets

(56) References Cited

U.S. PATENT DOCUMENTS

| | | | | |
|---|---|---|---|---|
| 8,305,717 | B2 * | 11/2012 | Parker | G09F 13/22 361/42 |
| 2006/0007059 | A1 | 1/2006 | Bell | |
| 2006/0186827 | A1 * | 8/2006 | Ragonesi et al. | 315/185 S |
| 2007/0215854 | A1 | 9/2007 | Chou | |
| 2008/0157687 | A1 * | 7/2008 | Lin | 315/185 S |
| 2010/0091496 | A1 | 4/2010 | Amoraga | |
| 2010/0164409 | A1 | 7/2010 | Lo | |
| 2010/0181941 | A1 * | 7/2010 | Kuo et al. | 315/320 |
| 2011/0026241 | A1 | 2/2011 | Kim et al. | |
| 2011/0175547 | A1 * | 7/2011 | Oh et al. | 315/294 |
| 2012/0248997 | A1 * | 10/2012 | Jung et al. | 315/192 |
| 2012/0268012 | A1 * | 10/2012 | Walker | 315/122 |
| 2013/0088160 | A1 * | 4/2013 | Chai et al. | 315/193 |

* cited by examiner

METHODS AND APPARATUS FOR COMPENSATING A REMOVAL OF LEDS FROM AN LED ARRAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO PRIOR APPLICATIONS

This application is the U.S. National Phase application under 35 U.S.C. § 371 of International Application No. PCT/IB2013/058515, filed on Sep. 13, 2013, which claims the benefit of U.S. Provisional Patent Application No. 61/710,894, filed on Oct. 8, 2012. These applications are hereby incorporated by reference herein.

TECHNICAL FIELD

The present invention is directed generally to compensating for removal of one or more LEDs from an LED array. More particularly, various inventive methods and apparatus disclosed herein relate to compensating for electrical changes resulting from cut-out of a portion of a grid of a plurality of LEDs.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

LED-based lighting fixtures and arrays may be installed in locations where they may cover and/or form all or portions of certain structures such as walls, ceilings, and/or floors. Such LED-based lighting fixtures must be installed so as to not interfere with certain devices that are present or that may be present in the area over which they are placed. For example, it may be undesirable to place an LED-based lighting fixture or a section of an LED array over sprinklers, projectors, speakers, and/or spot lights disposed within an indoor location since the LED-based lighting fixture or the section of the LED array may interfere with desired operation of such devices.

Thus, there is a need in the art to provide methods and apparatus that enable removal of a portion of a grid of a plurality of LEDs of an LED-based lighting unit or an LED array. The methods and apparatus may optionally enable, for example, a structure or device to pass through an opening created by the removed portion of the LED-based lighting unit.

SUMMARY

The present disclosure is directed to inventive methods and apparatus for compensating for electrical changes resulting from cut-out of a portion of a grid of a plurality of LEDs. For example, a compensating unit may be coupled to free wire segments of the grid created by the cut-out. The compensating unit may be configured to alter current supplied to remaining LEDs of the grid of LEDs. In some embodiments, a compensating unit is provided that is configured to and/or may be configured to lessen current supplied to one or more LEDs of an LED-based lighting unit or an array. The LEDs may be LEDs remaining after one or more LEDs originally provided with the LED-based lighting unit or the array were removed to create an opening therein.

Generally, in one aspect, a method for compensating a cut-out of LEDs and associated wiring in an LED-based lighting unit is provided and includes removing at least one LED from a grid of LEDs to create a grid opening in the grid of LEDs. The grid of LEDs is connected in a series parallel configuration by conductive wiring. Removing the at least one LED disjoins portions of the wiring and creates a plurality of free wire segments in the wiring. The free wire segments are electrically connected to the grid of LEDs and have previously been electrically connected to the removed at least one LED. The method further includes aligning an opening of a compensating unit at least partially with the grid opening and mechanically coupling the compensating unit to the free wire segments. The compensating unit is configured to alter current within the grid of LEDs to lessen the effect of increased current due to the removal of the at least one LED.

In some embodiments, the compensating unit is further configured to measure at least one electrical characteristic of the grid of LEDs to determine to what extent to alter current within the grid of LEDs.

In some embodiments, the compensating unit periodically short circuits at least one group of LEDs of the grid of LEDs to alter current within the grid of LEDs. The group of LEDs may be connected in parallel with one another.

In some embodiments, the compensating unit includes a plurality of diodes to alter current within the grid of LEDs.

In some embodiments, the compensating unit is utilized in removing the at least one LED from the grid of LEDs to create the grid opening.

In some embodiments, the compensating unit includes a plurality of light emitting diodes to alter current within the grid of LEDs. In some versions of those embodiments, the light emitting diodes are arranged about the opening of the compensating unit.

In some embodiments, the method further includes the step of installing an accessory device through the grid opening. In some versions of those embodiments, the accessory device is a sprinkler.

In some embodiments, the grid of LEDs is installed on at least one of a ceiling and a wall.

Generally, in another aspect, a method for compensating a cut-out of LEDs and associated wiring in an LED-based lighting unit is provided and includes the step of identifying removal of at least one LED from a plurality of LEDs of the LED-based lighting unit. The LEDs are connected in a series parallel configuration by conductive wiring. Removal of the at least one LED increases current supplied to at least one group of LEDs connected in parallel with one another relative to an original current supplied to the at least one group of LEDs prior to removal of the at least one LED. The method further includes determining a current alteration necessary to lessen current supplied to the at least one group of LEDs to a current level substantially similar to the original current and applying the current alteration to the at least one group of LEDs.

In some embodiments, applying the current alteration includes periodically short circuiting the at least one group of LEDs.

In some embodiments, applying the current alteration includes activating at least one current sink. In some versions of those embodiments the current sink includes at least one diode.

In some embodiments, the method further includes determining a value indicative of a number of the at least one LED removed to determine the current alteration.

In some embodiments, applying the current alteration includes electrically coupling a compensating unit to the conductive wiring. In some versions of those embodiments, the compensating unit is preconfigured to lessen current supplied to the at least one group of LEDs to the current level. In some versions of those embodiments, the compensating unit includes a plurality of diodes electrically coupleable to the conductive wiring.

Generally, in another aspect, an LED-based lighting unit with implemented increased current correction is provided and includes a plurality of LEDs, conductive wiring electrically coupling the LEDs in a series parallel configuration, and a current correction circuit electrically coupled in parallel with a group of the LEDs. The current correction circuit monitors at least one of current and power supplied to the group of the LEDs and periodically short circuits the group of LEDs when the at least one of current and power supplied to the group of the LEDs is determined to be too high.

In some embodiments, the current correction circuit includes a measurement component in series with a diode. The measurement component may integrate the current and cause the group of LEDs to be short circuited when the measurement component integrates the current to a predetermined level.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, and other types of electroluminescent sources.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" or an "LED array" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

LED-based lighting fixtures and arrays may be installed in locations where they may cover and/or form all or portions of certain structures such as walls, ceilings, and/or floors. Such LED-based lighting fixtures must be installed in locations so as to not interfere with certain devices that are present or that may be present in the area over which they are placed. For example, it may be undesirable to place an LED-based lighting array over sprinklers, projectors, speakers, and/or spot lights since the LED-based lighting array may interfere with desired operation of such structures. Thus, Applicants have recognized and appreciated a need in the art to provide methods and apparatus that enable removal of a portion of a grid of a plurality of LEDs of an LED-based lighting unit. The methods and apparatus may optionally enable, for example, a structure to pass through an opening created by the removed portion of the LED-based lighting unit. More generally, Applicants have recognized and appreciated that it would be beneficial to provide methods and apparatus related to compensating for electrical changes resulting from cut-out of a portion of a grid of a plurality of LEDs.

In view of the forgoing, various inventive methods and apparatus disclosed herein relate to compensating for removal of one or more LEDs from an LED-based lighting unit.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, various embodiments of the methods and apparatus disclosed herein are particularly suited for LED-based lighting units having a particular electrical and/or positional arrangement of a plurality of LEDs. Accordingly, for illustrative purposes, the claimed invention is often discussed in conjunction with such implementations. However, other configurations and applications of this approach are contemplated without deviating from the scope or spirit of the claimed invention.

Figure 1:
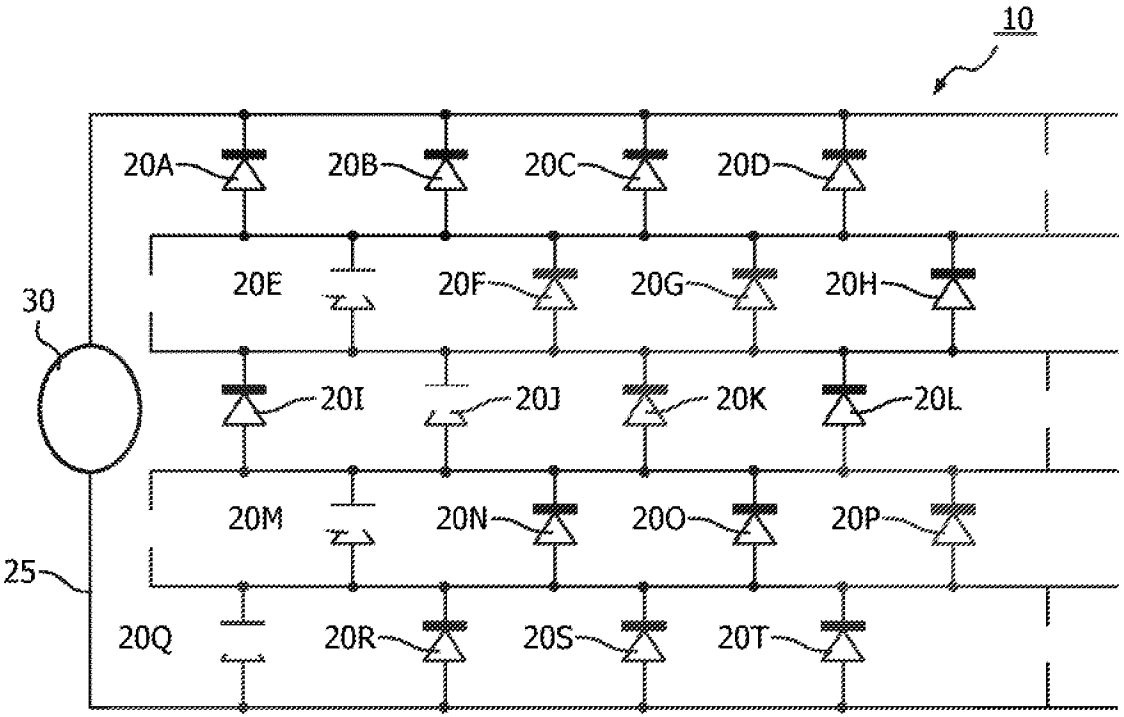
FIG. 1 illustrates an LED-based lighting unit having a plurality of LEDs connected in a series parallel configuration.

FIG. 1 illustrates an LED-based lighting unit 10 having a plurality of LEDs 20A-T connected in a series parallel configuration with one another via wiring grid 25. The LEDs 20A-T include five rows of LEDs (20A-D; 20E-H; 20I-L; 20M-P; and 20Q-T) connected in series with one another, with each of the five rows including four of LEDs 20A-T connected in parallel with one another. A power supply 30 is connected between the cathodes of the LEDs 20A-D and the anodes of the LEDs 20Q-T. The power supply 30 is utilized to power the LEDs 20. In some embodiments the power supply 30 may be an LED-driver that may be powered by a power source such as a battery and/or a mains power supply. In some embodiments the power supply 30 may include a controller for adjusting one or more parameters of power provided to the LEDs 20A-T.

In some embodiments, the wiring 25 may be a metal wire that electrically and mechanically interconnects the LEDs 20A-T in a mesh grid configuration. In some embodiments the wiring 25 may enable the LEDs 20A-T to be provided without a PCB. For example, in some embodiments the LEDs 20A-T may be electrically coupled to and wholly mechanically supported by the wiring 25. In some embodiments the wiring 25 may be rigid and/or fix the positioning of the LEDs 20A-T relative to one another. For instance, the wiring 25 may be fixedly deformable by a user to a plurality of shapes thereby enabling a plurality of adjustments to the position of the LEDs 20A-T relative to one another. Such metal mesh wire configuration may be arranged in two dimensions (flat) or may optionally be flexed and/or fixedly deformed into three dimensions (e.g., formed to fit over a pre-existing structure, formed into a three dimensional shape, temporarily flexed). In some embodiments the wiring 25 may be cut from a larger mesh type metal wire grid having a plurality of interconnected LEDs. In some embodiments the wiring 25 may optionally be electrically and/or mechanically interconnected with additional separate mesh type metal wire grids that also electrically and/or mechanically support a plurality of LEDs.

Figure 2:
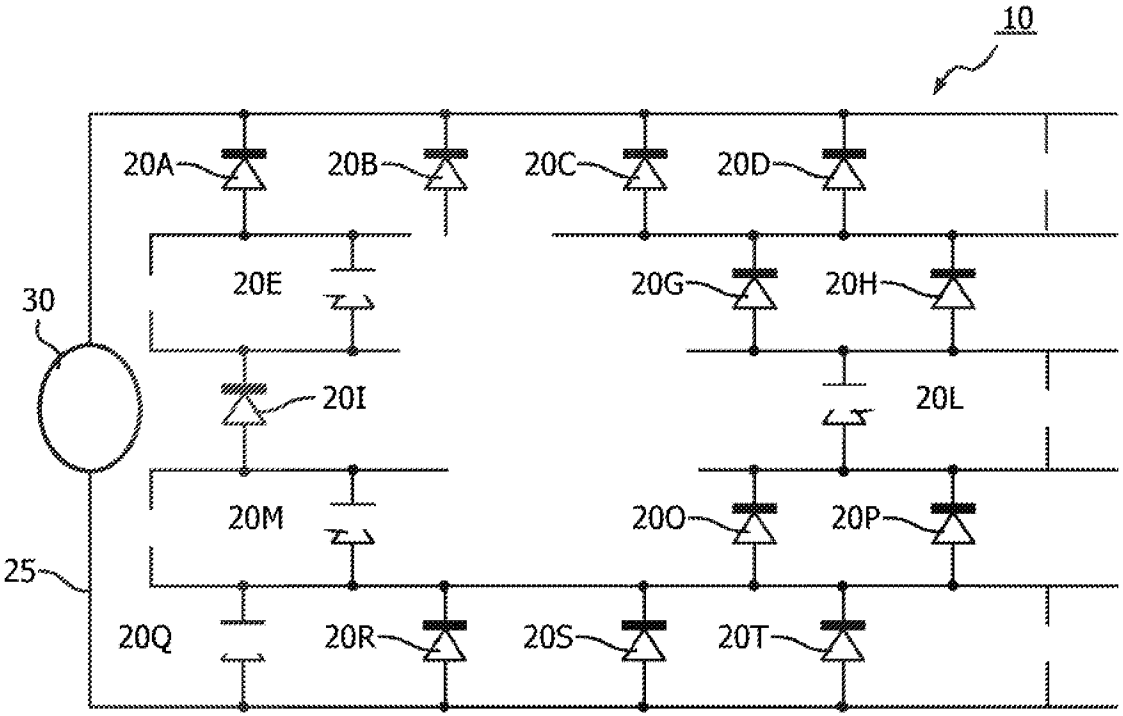
FIG. 2 illustrates the LED-based lighting unit of FIG. 1 with a cut-out that has removed some of the LEDs and associated wiring.

FIG. 2 illustrates the LED-based lighting unit 10 of FIG. 1 with a cut-out that has removed some of the LEDs 20A-D and associated wiring 25. In particular, LEDs 20F, 20J, 20K, and 20N have been removed and portions of wiring 25 extending from those LEDs has also been removed. In the configuration of FIG. 2, all of the remaining LEDs 20A-T will continue to function when powered by power supply 30, except for LED 20B, which is not connected at its anode end. However, the current in LEDs of LED rows where one or more LEDs were removed will be increased. In particular, the current in LEDS 20E, 20G-I, 20L-M, and 20O-P will be increased. The increase in current may cause those LEDs to appear brighter and/or will reduce the lifetime of those LEDs and/or may cause unsafe operating conditions.

In some embodiments, the cut-out of FIG. 2 may be created by a user during and/or after installation of the LED-based lighting unit. For example, in some embodiment the cut-out may be created after installation of the LED-based lighting unit to enable installation of a structure through the LED-based lighting unit. In some embodiments the cut-out may be made utilizing a cutting tool such as a blade. In some embodiments the cut-out may be made utilizing a compensating unit such as compensating unit 40 of FIG. 3. For example, the compensating unit 40 may be annular and may include separable pieces that, when brought toward one another cut through the wiring 25 via mechanical pressure. The cut-out portion of the wiring 25 and accompanying LEDs may be removed and the remaining portion of the wiring 25 may optionally be mechanically captured by and electrically connected to the compensating unit 40. Also, for example, the compensating unit 40 may include at least one sharp edge that may be utilized to cut through the wiring 25.

Figure 3:
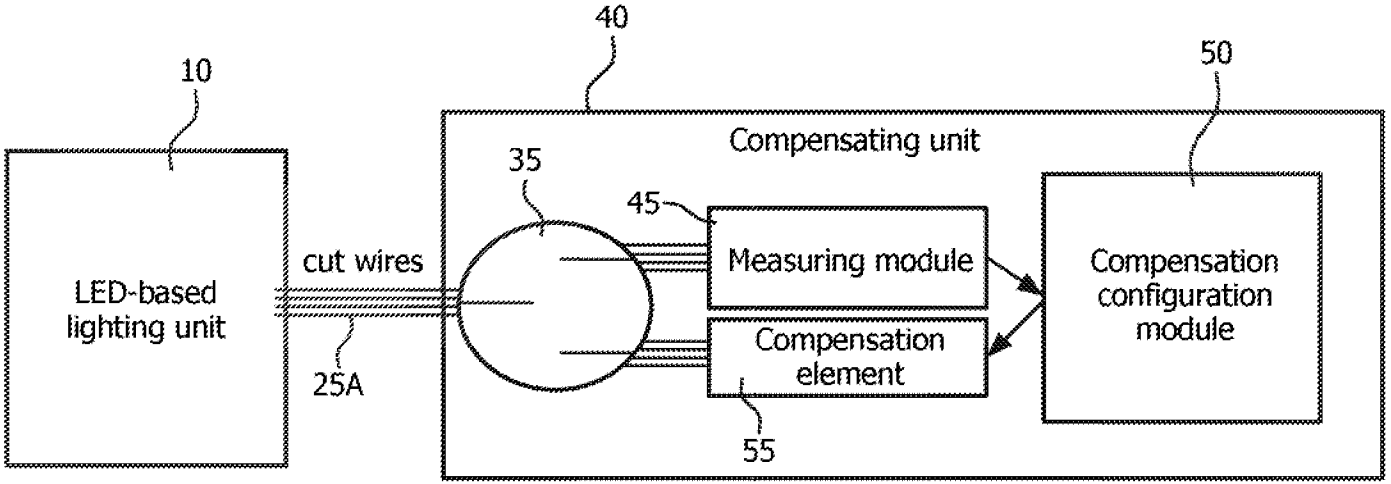
FIG. 3 illustrates a schematic of the LED-based lighting unit of FIG. 1 electrically connected to an embodiment of a compensating unit.

FIG. 3 illustrates a schematic of the LED-based lighting unit 10 of FIG. 1 electrically connected to an embodiment of a compensating unit 40. Cut wires 25A of wiring 25 are illustrated coupled to a connection structure 35 of the compensating unit 40. In some embodiments the connection structure 35 may include conductive structure to couple to the cut wires 25A and may also define an opening. The opening may be aligned with at least a portion of the opening created by the cut-out in FIG. 2 to enable a structure to extend through the opening of the connection structure 35 and the opening created by the cut-out. In some embodiments the connection structure 35 may be annular. In some embodiments the connection structure may include a first part and a second part that are movable relative to one another. For example, the first part and second part may be mated with one another and may capture the cut wires 25A therebetween via mechanical pressure. In some embodiments the connection structure 35 may include a plurality of quick connection structures that may each receive one or more of the cut wires 25A.

In some embodiments, an alignment indicator may be provided on the connection structure 35 and/or the LED-based lighting unit 10 to provide an indication of proper orientation of the connection structure 35 relative to the wiring 25 to ensure the cut wires 25A are properly electrically coupled to the connection structure 35. The connection structure 35 includes and/or is coupled to additional conductive structure to enable appropriate connections between cut wires 25A and other components of the compensating unit 40. In some embodiments the dimensions of the connection structure 35 may be based on the wiring 25 of the LED-based lighting unit 10. For example, in some embodiments the dimensions of the connection structure 35 may be based on the distance of the gaps in the wiring 25 and/or the spacing of the LEDs 20A-T between one another. Correlation of the dimensions of the connection structure 35 and the dimensions of the LED-based lighting unit 10 may enable the connection structure 35 to be coupled to cut wires 25A of wiring 25. In some embodiments the dimensions of the connection structure 35 and/or the dimensions of any opening through the connection structure 35 may substantially conform to the dimensions of the cut-out in the wiring 25.

The connection structure 35 is in electrical communication with a measuring module 45 and a compensation element 55. The measuring module 45 and compensation element 55 are in electrical communication with a compensation configuration module 50. In some embodiments all or portions of the measuring module 45, configuration module 50, and/or compensation element 55 may be embodied on one or more controllers and/or memory of the compensating unit 40. The measuring module 45 may measure and/or analyze one or more electrical characteristics determined via input from cut wires 25A. For example, the measuring module 45 may measure the current that flows through one or more of the cut wires 25A when a voltage is applied (via the LED-based lighting unit 10 and/or the compensating unit 40). The applied voltage must exceed the voltage wherein connected LEDs will start conducting current. The compensation configuration module 50 may receive data indicative of the measured electrical characteristics from measuring module 45 and, based on such data, determine desired compensation to lessen and/or remove undesirable effects caused by removal of LEDs from the LED-based lighting unit 10. For example, current readings from measuring module 45 and applied voltage information may be utilized to identify the number of LEDs that are connected in parallel with one another in one or more LED rows measurable via the cut wires 25A. Based on the identified number of LEDs connected in parallel with one another, the compensation configuration module 50 may determine the number of LEDs that have been removed by making the cut-out. For example, the compensation configuration module 50 may compare the measured current for each row of LEDs to a preferred current for each row of LEDs to deduce the total number of LEDs in each row that have been removed by making the cut-out.

The determined desired compensation to lessen undesirable effects caused by removal of LEDs from the LED-based lighting unit 10, may be utilized to set one or more characteristics of compensation element 55. For example, in some embodiments the compensation element 55 may include one or more current sinking elements that may each be in electrical connection with a row of LEDs via connections with cut wires 25A. For example, in some embodiments the compensation element 55 may include one or more passive elements such as a diode that sinks current and a selected number of such passive elements may be electrically connected with one or more rows of LEDs to achieve desired current in remaining of the LEDS. Also, for example, in some embodiments the compensation element 55 may include one or more active elements such as a semiconductor that sinks current. The amount of current the semiconductor sinks may be based on the desired compensation to lessen undesirable effects caused by removal of LEDs. For example, the semiconductor may sink a degree of current necessary to cause remaining LEDs to be powered with approximately the same amount of current as utilized prior to the cut-out occurring.

Figure 4A:
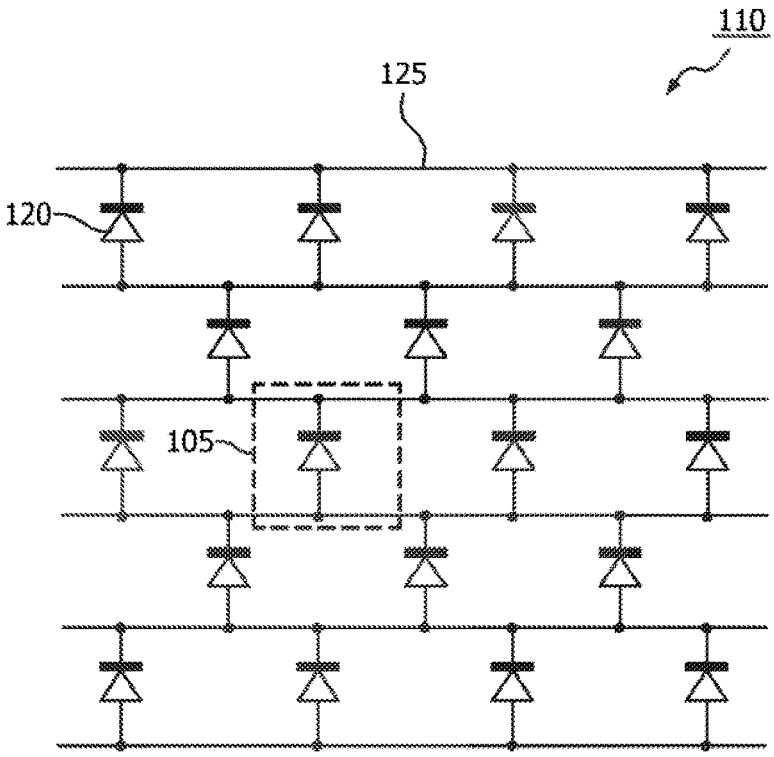
FIG. 4A illustrates another LED-based lighting unit having a plurality of LEDs connected in a series parallel configuration and illustrating a cut-out that may be made to remove an LED and associated wiring from the LED-based lighting unit.
Figure 4B:
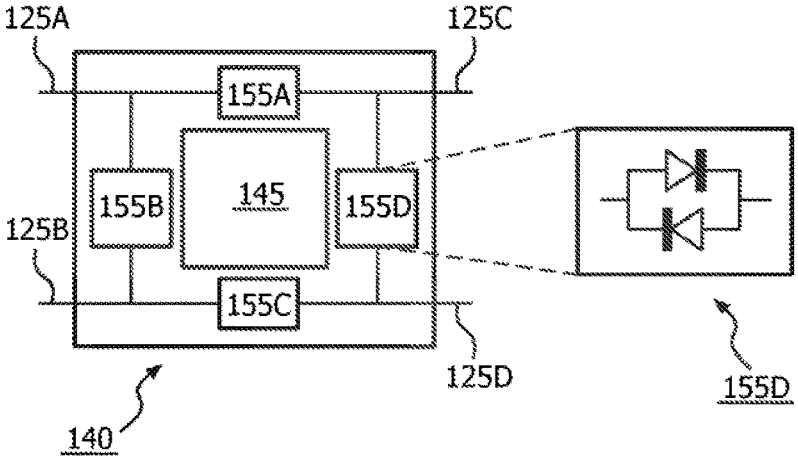
FIG. 4B illustrates a compensating unit that may be utilized to electrically compensate for the cut-out of FIG. 4A.

FIG. 4A illustrates another LED-based lighting unit 110 having a plurality of LEDs 120 connected in a series parallel configuration. A cut-out 105 is also illustrated in phantom lines that may be made to the LED-based lighting unit 110 to remove the enclosed LED 120 and associated wiring 125 from the LED-based lighting unit 110. FIG. 4B illustrates a compensating unit 140 that may be utilized to electrically compensate for the cut-out 105 of FIG. 4A. In some embodiments the dimensions of the compensating unit 140 may substantially match the dimensions of the cut-out 105. In some embodiment the cut-out 105 may be made utilizing a template that corresponds to the compensating unit 140 and/or utilizing the compensating unit 140.

The compensating unit 140 includes an opening 145 therein that may be aligned with the opening formed by the cut-out 105. When the compensating unit 140 is electrically coupled to the wiring 125 the opening 145 may align with the opening created by the cut-out 105. A structure such as a sprinkler, speaker, spotlight, etc. may be installed through and/or extend through the opening 145 and the opening created by the cut-out 105. The compensating unit 140 includes four wire connections 125A-D that may each be coupled to one of the four free wire segments that would be created by the illustrated cut-out 105 of FIG. 4A. In some embodiments each of the wire connections 125A-D may include a free wire that may be directly or indirectly (e.g., via a bridging connector) coupled to a respective of the free wire segments that would be created by the illustrated cut-out 105 of FIG. 4A. In the illustrated embodiment any of the wire connectors 125A-D may be connected to any one or the free wire segments of wiring 125 to achieve the desired compensation. In some embodiments each of the wire connections 125A-D may include quick connection elements that receive and retain a respective of the free wire segments that would be created by the illustrated cut-out of FIG. 4A. Some embodiments may utilize additional and/or alternative structure to electrically couple the compensating unit 140 to the wiring 125.

The compensating unit 140 includes four diode pairs 155A-D. Each diode pair 155A-D includes two diodes connected in anti-parallel with one another as illustrated in the close-up view of diode pair 155D. The anti-parallel configuration of each of the diode pairs 155A-D may accommodate installation of the compensating unit 140 without regard to polarity. In some embodiments a single diode may be provide in lieu of one or more of the diode pairs. In some embodiments the diodes may include zener diodes. In some embodiments the diodes may include light emitting diodes. In some embodiments where the diodes include light emitting diodes, at least some of the light emitting diodes may be positioned about the opening 145 and light emitted by the light emitting diodes may be visible through and/or around the opening 145 and/or the opening created by the cut-out 105.

Diode pair 155A is interposed between wire connections 125A and 125C; diode pair 155B is interposed between wire connections 125A and 125B; diode pair 155C is interposed between wire connections 125B and 125D; and diode pair 155D is interposed between wire connections 125C and 125D. In some embodiments fewer than four diode pairs 155A-D may be provided. The voltage drop of each diode in the diode pairs 155A-D may be based on the voltage drop of the LED 120 that is removed by the cut-out 105. For example, the compensating unit 140 may be configured for use with the LED-based lighting unit 110 and configured to compensate for removal of a single LED 120. For example, in some embodiments the forward voltage drop of the removed LED 120 may be approximately 2.8 V and this is compensated by two diode pairs 155B and 155D that are ideally configured to conduct half of the current through a diode 120 in a normal configuration. The installation of the compensating unit 140 to replace the removed LED 120 may cause substantially the same amount of current to pass through other of the LEDs 120 (e.g., those in the same row as the removed LED 120) as had passed through prior to removal of the LED 120.

Figure 5A:
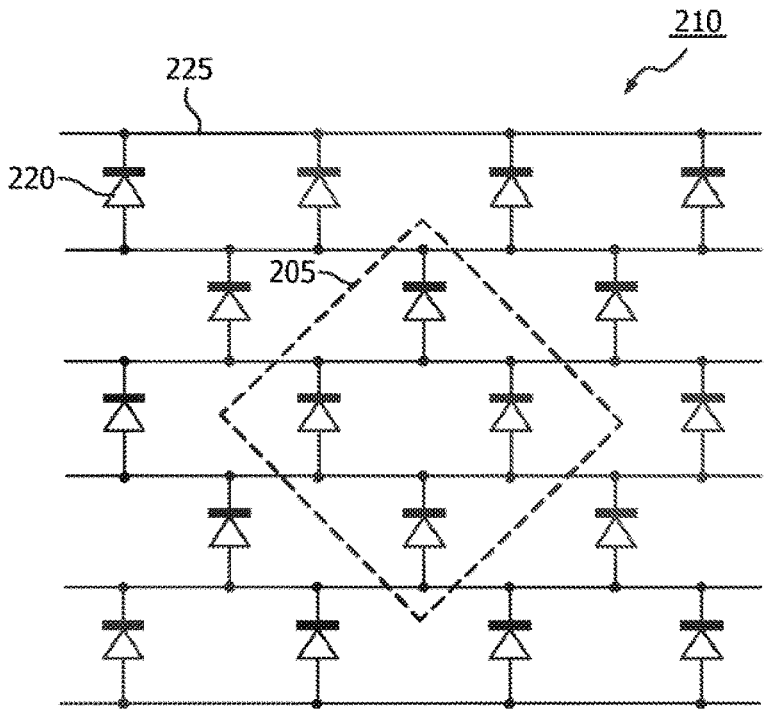
FIG. 5A illustrates another LED-based lighting unit having a plurality of LEDs connected in a series parallel configuration and illustrating a cut-out that may be made to remove an LED and associated wiring from the LED-based lighting unit.
Figure 5B:
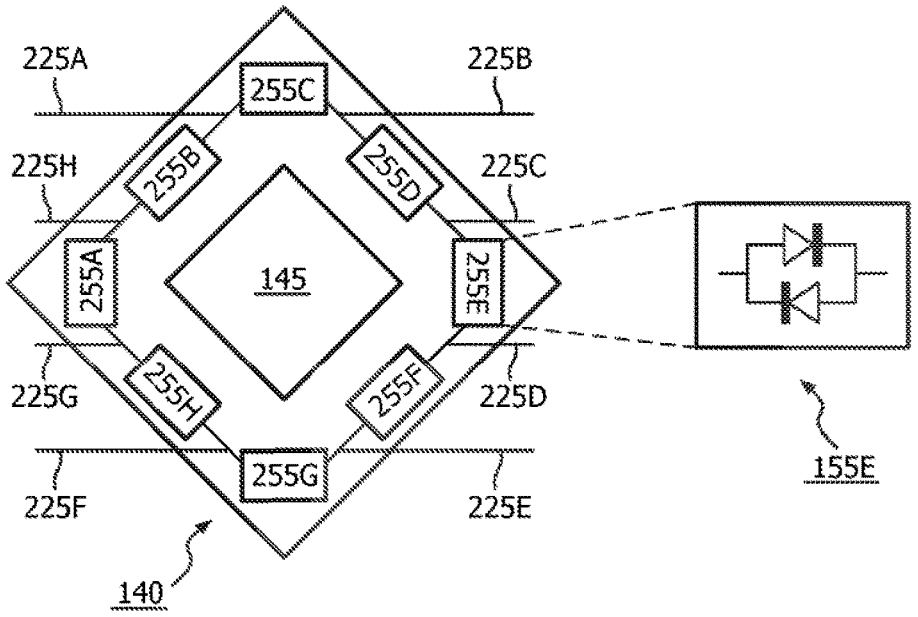
FIG. 5B illustrates a compensating unit that may be utilized to electrically compensate for the cut-out of FIG. 5A.

FIG. 5A illustrates another LED-based lighting unit 210 having a plurality of LEDs 220 connected in a series parallel configuration. A cut-out 205 is also illustrated in phantom lines that may be made to the LED-based lighting unit 210 to remove the enclosed four LEDs 220 and associated wiring 225 from the LED-based lighting unit 210. FIG. 5B illustrates a compensating unit 240 that may be utilized to electrically compensate for the cut-out 205 of FIG. 5A. In some embodiments the dimensions of the compensating unit 240 may substantially match the dimensions of the cut-out 205. In some embodiment the cut-out 205 may be made utilizing a template that corresponds to the compensating unit 240 and/or utilizing the compensating unit 240.

The compensating unit 240 includes an opening 245 therein that may be aligned with the opening formed by the cut-out 205. When the compensating unit 240 is electrically coupled to the wiring 225 the opening 245 may align with the opening created by the cut-out 205. The compensating unit 240 includes eight wire connections 225A-E that may each be coupled to one of the eight free wire segments that would be created by the illustrated cut-out of FIG. 5A. In the illustrated embodiment any of the wire connectors 225A-D may be connected to any one or the free wire segments of wiring 225 to achieve the desired compensation. The compensating unit 240 includes eight diode pairs 255A-D. Each diode pair 255A-D includes two diodes connected in anti-parallel with one another as illustrated in the close-up view of diode pair 255E. In some embodiments a single diode may be provide in lieu of one or more of the diode pairs. In some embodiments the diodes may include zener diodes and/or light emitting diodes. In some embodiments where the diodes include light emitting diodes, at least some of the light emitting diodes may be positioned about the opening 245 and light emitted by the light emitting diodes may be visible through and/or around the opening 245 and/or the opening created by the cut-out 205. In some embodiments the compensating unit might be implemented as an active element. For example, a processor module that harvests the energy normally dissipated by the cut out LEDs (e.g. for powering a sensor or a communication module) and passes the current actively through the wires may be utilized.

Diode pair 255A is interposed between wire connections 225G and 225H; diode pair 255B is interposed between wire connections 225A and 225H; diode pair 255C is interposed between wire connections 225A and 225B; diode pair 255D is interposed between wire connections 225B and 225C; diode pair 255E is interposed between wire connections 225C and 225D; diode pair 255F is interposed between wire connections 225D and 225E; diode pair 255G is interposed between wire connections 225E and 225F; and diode pair 255H is interposed between wire connections 225F and 225G. The voltage drop of each diode in the diode pairs 255A-D may be based on the voltage drop of the LEDs 220 that are removed by the cut-out 205. The installation of the compensating unit 240 to replace the removed LEDs 220 may cause substantially the same amount of current to pass through other of the LEDs 220 (e.g., those in the same rows as the removed LEDs 220) as had passed through prior to removal of the LEDs 220.

Figure 6A:
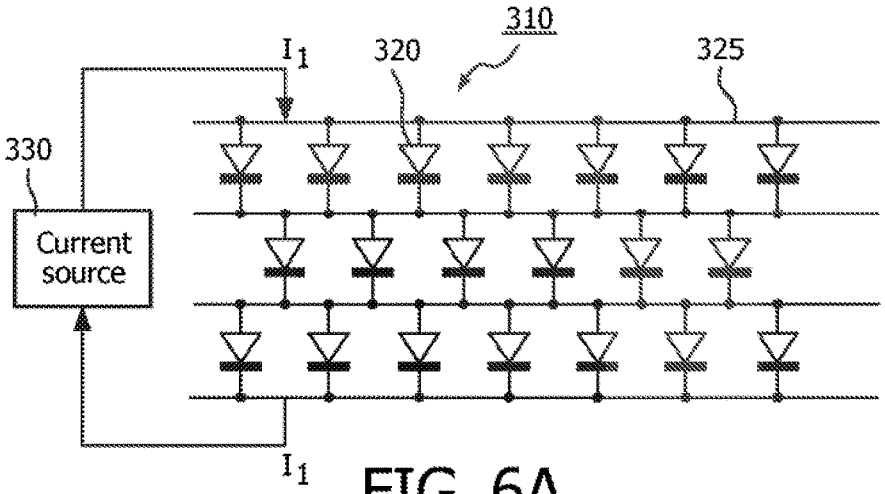
FIG. 6A illustrates another LED-based lighting unit having a plurality of LEDs connected in a series parallel configuration.
Figure 6B:
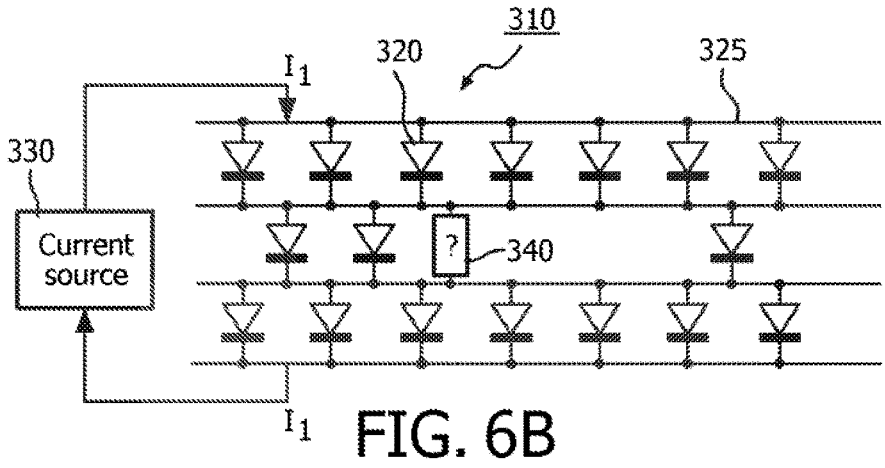
FIG. 6B illustrates the LED-based lighting unit of FIG. 6A with a cut-out that has removed some of the LEDs and associated wiring, and with a compensating unit electrically connected to remaining of the LEDs.

FIG. 6A illustrates another LED-based lighting unit 310 having a plurality of LEDs 320 connected in a series parallel configuration and a current source 330 driving the LEDs 320. FIG. 6B illustrates the LED-based lighting unit 310 of FIG. 6A with a cut-out that has removed some of the LEDs 320 and portions of associated wiring 325 from the middle row of LEDs 320. A compensating unit 340A is also illustrated electrically connected in parallel with the three remaining LEDs 320 of the middle row of LEDs 320. In some embodiments the compensating unit 340 may be installed after removal of the LEDs 320. In some embodiments one or more compensating unit 340 may be provided preinstalled in one or more row of LEDs 320.

Figure 6C:
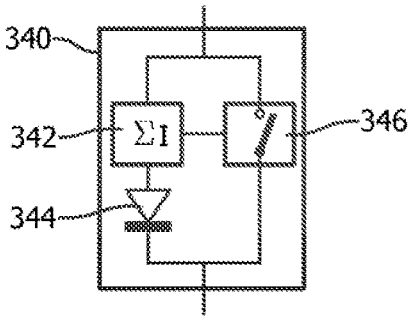
FIG. 6C illustrates an embodiment of the compensating unit of FIG. 6B in additional detail.

FIG. 6C illustrates an embodiment of the compensating unit 340 of FIG. 6B in additional detail. The compensating unit 340 includes a measuring module 342, a diode 344, and a compensation element 346. In some embodiments the current supplied to the diode 344 may be integrated by the measuring module 342. If the integrated current over a period of time reaches a level which may be undesirable for the middle row of LEDs 320, then the compensation element 346 short circuits the diode 344, the module 342, and the entire middle row of LEDs 320—thereby protecting the LEDs 320 in the row from excess current. In some embodiments the measuring module 342 may include a capacitor or a resistor. In some embodiments the measuring module 342 may additionally and/or alternatively measure the power consumed by the diode 344. For example, the measuring module 342 may measure the heat generated by the diode 344 to indirectly measure the power. In some embodiments the diode 344 may be an LED. In some versions of those embodiments the diode 344 may be an LED that has substantially similar characteristics as the other LEDs 320 in the same row of LEDs 320. In some embodiments the compensation element 346 may include a switch that is activated by the measuring module 342 upon integration of an amount of current and that short circuits the row of LEDs 320. In some embodiments the compensation element 346 may optionally include a controller that receives input from the measuring module 342 and causes the row of LEDs 320 to be short circuited when such input indicates current of a level that may be undesirable for the row of LEDs 320.

Figure 7A:
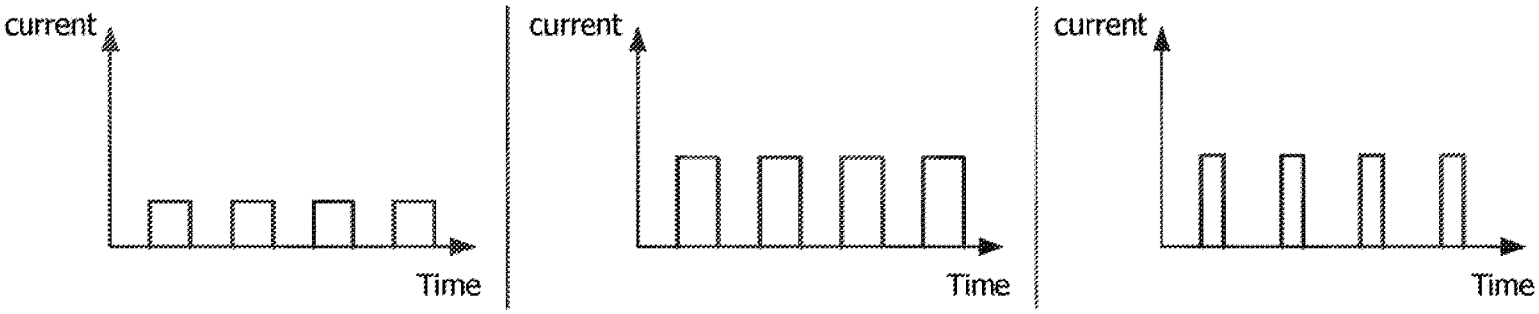
FIG. 7A illustrates, from left to right: an implementation of current over time for the middle row of LEDs of FIG. 6A; current over time for the middle row of LEDs of FIG. 6B without the compensating units; and current over time for the middle row of LEDs of FIG. 6B with the compensating units.

FIG. 7A illustrates, from left to right, an implementation of current over time for the middle row of LEDs 320 of FIG. 6A, current over time for the middle row of LEDs 320 of FIG. 6B without the compensating unit 340, and current over time for the middle row of LEDs 320 of FIG. 6B with the compensating unit 340. Current over time for the middle row of LEDs 320 of FIG. 6A is periodically at a first level for a first duration of time, thereby generating periodic pulses of a first integrated current. The period of the pulses is determined by the PWM frequency of the current source 330. Current over time for the middle row of LEDs 320 of FIG. 6B without the compensating unit 340 is periodically at a second level for the first duration of time, thereby generating periodic pulses of a second integrated current. The second integrated current is larger than the first integrated current due to the removal of LEDs 320 and the increased second level of current over the time period. The second level of current may be undesirable (e.g., due to brightness of emitted light and/or deterioration of the life of the LEDs 320). The period of the pulses is determined by the PWM frequency of the current source 330.

Current over time for the middle row of LEDs 320 of FIG. 6B with the compensating unit 340 is periodically at the second level for a second duration of time, thereby generating periodic pulses of a third integrated current. The third integrated current is substantially the same as the first integrated current. Although the second level of current is present, it is present over a shorter time period due to the compensating unit 340 shorting the row of LEDs before the integrated current reaches a level that may be undesirable for the row of LEDs 320. The period of the current pulses generated by the current source 330 for the middle row of LEDs 320 is shortened by the compensating unit 340 to decrease the effective current through the middle row of LEDs 320 to substantially conform to the first level.

Figure 7B:
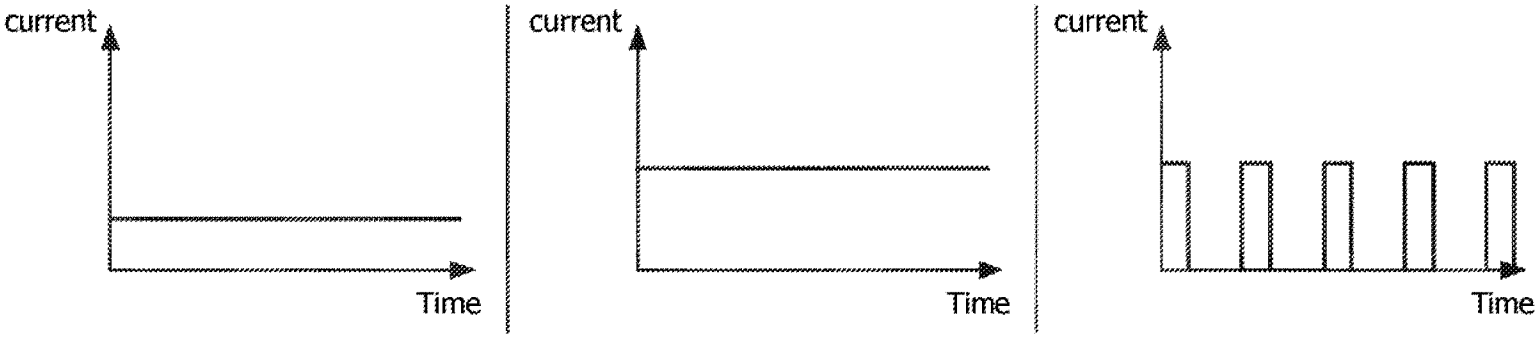
FIG. 7B illustrates, from left to right: another implementation of current over time for the middle row of LEDs of FIG. 6A; current over time for the middle row of LEDs of FIG. 6B without the compensating unit; and current over time for the middle row of LEDs of FIG. 6B with the compensating unit.

FIG. 7B illustrates, from left to right, another implementation of current over time for the middle row of LEDs 320 of FIG. 6A, current over time for the middle row of LEDs 320 of FIG. 6B without the compensating unit 340, and current over time for the middle row of LEDs 320 of FIG. 6B with the compensating unit 340. FIG. 7B illustrates current values for embodiments where current source 330 is a constant current source. Current over time for the middle row of LEDs 320 of FIG. 6A is at a constant first level, thereby generating a constant first level of current. Current over time for the middle row of LEDs 320 of FIG. 6B without the compensating unit 340 is at a constant second level, thereby generating a constant second level of current. The second level of current is larger than the first level of current and the second level of current may be undesirable.

Current over time for the middle row of LEDs 320 of FIG. 6B with the compensating unit 340 is periodically at the second level for a second duration of time, thereby generating periodic pulses of a third integrated current. The third integrated current is substantially the same as the first integrated current. Although the second level of current is present, it is present over a shorter time period due to the compensating unit 340 shorting the row of LEDs before the current over a period of time reaches a level that may be undesirable for the row of LEDs 320. The period of the current pulses generated by the current source 330 for the middle row of LEDs 320 is shortened by the compensating unit 340 to decrease the effective current through the middle row of LEDs 320 to substantially conform to the first level.

Figure 8:
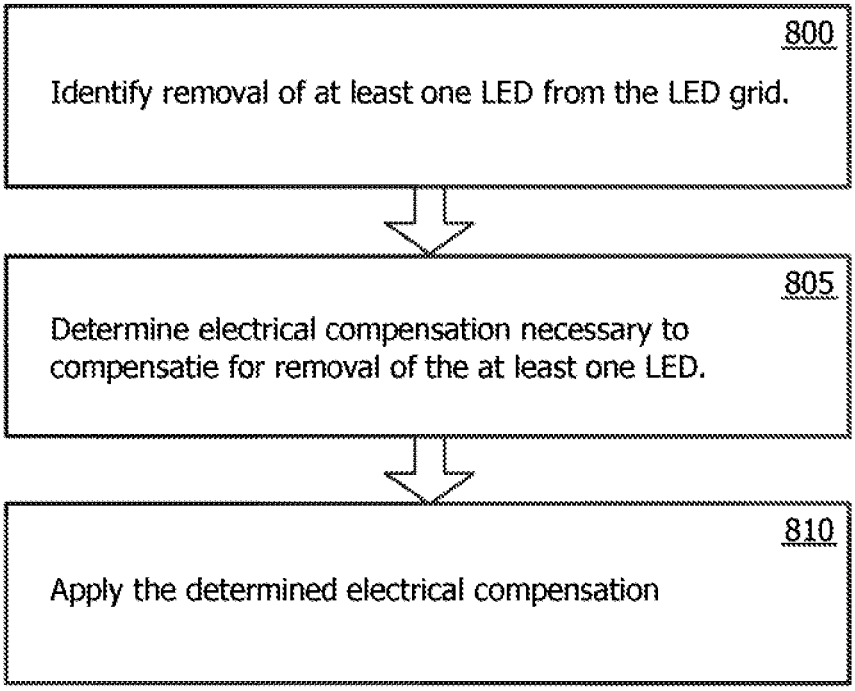
FIG. 8 illustrates an embodiment of a method of compensating a cut-out of LEDs and associated wiring in an LED-based lighting unit.

FIG. 8 illustrates an embodiment of a method of compensating a cut-out of LEDs and associated wiring in an LED-based lighting unit. Other embodiments may perform the steps in a different order, omit certain steps, and/or perform different and/or additional steps than those illustrated in FIG. 8. In some embodiments a controller, such as a controller of compensating units 40 and/or 340 may perform one or more of the steps of FIG. 8. At step 800 removal of at least one LED from the LED grid is identified. For example, one of the compensating units 40 and/or 340 may recognize that at least one LED from the LED grid has been removed due to change in a measurable parameter indicative of current and/or power across one or more LEDs. Also, for example, a user may identify the removal of at least one LED from the LED grid. At step 805 the electrical compensation necessary to compensate for removal of the at least one LED is determined. For example, one of the compensating units 40 and/or 340 may utilize measured current and/or power across one or more LEDs to determine current reduction that may need to be applied across one or more rows of LEDs. Also, for example, a user may identify the necessary electrical compensation based on the number of LEDs removed and/or based on identification of a compensating unit provided in combination with an LED-based lighting unit and/or a cut-out for an LED-based lighting unit. At step 810 the determined electrical compensation is applied. For example, one or more parameters of the compensation element 55 of compensation unit 50 may be adjusted to alter the current sinking applied by the compensating element 55. Also, for example, compensation element 346 may periodically short a row of LEDs to adjust the current applied to the row of LEDs. Also, for example, the compensation unit 140 may be electrically coupled to wiring 125 of LED-based lighting unit 110.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

All definitions, as defined and used herein, should be understood to control over dictionary definitions, definitions in documents incorporated by reference, and/or ordinary meanings of the defined terms.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims, if any, are provided merely for convenience and should not be construed as limiting the claims in any way.

The invention claimed is:

1. A method for compensating a cut-out of LEDs and associated wiring in an LED-based lighting unit, comprising:

removing at least one LED from a grid of LEDs to create a grid opening in the grid of LEDs, said grid of LEDs connected in a series parallel configuration by conductive wiring;

wherein removing said at least one LED disjoins portions of said wiring and creates a plurality of free wire segments in said wiring, said free wire segments electrically connected to said grid of LEDs and having previously been electrically connected to the removed said at least one LED;

*providing a compensating unit, said compensating unit having a through-bore arranged therethrough;* aligning [an opening] *the through-bore* of [a] *said* compensating unit at least partially with said grid opening; and mechanically coupling said compensating unit to said free wire segments;

wherein said compensating unit is configured to alter current within said grid of LEDs to lessen the effect of increased current due to the removal of said at least one LED.

2. The method of claim 1, wherein said compensating unit is further configured to measure at least one electrical characteristic of said grid of LEDs to determine to what extent to alter current within said grid of LEDs.

3. The method of claim 1, wherein said compensating unit periodically short circuits at least one group of LEDs of said grid of LEDs to alter current within said grid of LEDs, said group of LEDs being connected in parallel with one another.

4. The method of claim 1, wherein said compensating unit includes a plurality of diodes to alter current within said grid of LEDs.

5. The method of claim 1, wherein said compensating unit is utilized in removing said at least one LED from said grid of LEDs to create said grid opening.

6. The method of claim 1, wherein said compensating unit includes a plurality of light emitting diodes to alter current within said grid of LEDs.

7. The method of claim 6, wherein said light emitting diodes are arranged about said opening of said compensating unit.

8. The method of claim 1, further comprising installing an accessory device through said grid opening.

9. The method of claim 1, wherein said grid of LEDs is installed on at least one of a ceiling and a wall.

10. A method for compensating a cut-out of LEDs and associated wiring in an LED-based lighting unit, comprising:

identifying removal of at least one LED from a plurality of LEDs of said LED-based lighting unit, said LEDs connected in a series parallel configuration by conductive wiring;

wherein removal of said at least one LED increases current supplied to at least one group of LEDs connected in parallel with one another relative to an original current supplied to said at least one group of LEDs prior to removal of said at least one LED;

determining a current alteration necessary to lessen current supplied to said at least one group of LEDs to a current level substantially similar to said original current; [and]

*providing a compensating unit, said compensating unit having a through-bore arranged therethrough; and* applying said current alteration *via said compensating unit* to said at least one group of LEDs.

11. The method of claim 10, wherein applying said current alteration includes periodically short circuiting said at least one group of LEDs.

12. The method of claim 10, wherein applying said current alteration includes activating at least one current sink.

13. The method of claim 12, wherein said current sink includes at least one diode.

14. The method of claim 10, further comprising determining a value indicative of a number of said at least one LED removed to determine said current alteration.

15. The method of claim 10, wherein applying said current alteration includes electrically coupling [a] *said* compensating unit to said conductive wiring.

16. The method of claim 15, wherein said compensating unit is preconfigured to lessen current supplied to said at least one group of LEDs to said current level.

17. The method of claim 15, wherein said compensating unit includes a plurality of diodes electrically coupleable to said conductive wiring.

*18. A method for compensating a cut-out of LEDs and associated wiring in an LED-based lighting unit, comprising:*

*identifying removal of at least one LED from a plurality of LEDs of said LED-based lighting unit, said LEDs connected in a series parallel configuration by conductive wiring;*

*determining an electrical compensation necessary to compensate for removal of the at least one LED;*

*providing a compensating unit, said compensating unit having a through-bore arranged therethrough; and,*

*applying said determined electrical compensation to said at least one group of LEDs via said compensating unit.*

* * * * *